(12) United States Patent
Klaiber et al.

(10) Patent No.: US 11,633,082 B2
(45) Date of Patent: Apr. 25, 2023

(54) RINSING CONTAINER, METHOD FOR PRODUCING A RINSING CONTAINER AND HOUSEHOLD DISHWASHING MACHINE

(71) Applicant: BSH Hausgeräte GmbH, Munich (DE)

(72) Inventors: Armin Klaiber, Günzburg (DE); Manfred Herb, Syrgenstein (DE); Helmut Rössle, Blindheim (DE); Johann Schabert, Holzheim (DE); Dieter Hotz, Dischingen (DE)

(73) Assignee: BSH Hausgeräte GmbH, Munich (DE)

( * ) Notice: Subject to any disclaimer, the term of this patent is extended or adjusted under 35 U.S.C. 154(b) by 714 days.

(21) Appl. No.: 16/616,542

(22) PCT Filed: May 24, 2018

(86) PCT No.: PCT/EP2018/063622
§ 371 (c)(1),
(2) Date: Nov. 25, 2019

(87) PCT Pub. No.: WO2018/224324
PCT Pub. Date: Dec. 13, 2018

(65) Prior Publication Data
US 2021/0161358 A1     Jun. 3, 2021

(30) Foreign Application Priority Data

Jun. 9, 2017 (DE) .................. 10 2017 209 824.4

(51) Int. Cl.
*A47L 15/42* (2006.01)
*B21D 51/18* (2006.01)
(Continued)

(52) U.S. Cl.
CPC ....... *A47L 15/4246* (2013.01); *A47L 15/0002* (2013.01); *A47L 15/0084* (2013.01); *B21D 51/18* (2013.01); *F16B 11/006* (2013.01)

(58) Field of Classification Search
CPC ................ A47L 15/4246; B21D 51/18
See application file for complete search history.

(56) References Cited

U.S. PATENT DOCUMENTS 9,155,443 B2 * 10/2015 Bennett ............... A47L 15/4246
2010/0132749 A1 * 6/2010 Buhlmeyer ......... A47L 15/4246
                                                        134/115 R
(Continued)

FOREIGN PATENT DOCUMENTS

CN 202341984 U 7/2012
CN 106466162 A 3/2017
(Continued)

OTHER PUBLICATIONS

Search Report CN 2018800380007 dated Apr. 8, 2022.
International Search Report PCT/EP2018/063622 dated Oct. 31, 2019.

*Primary Examiner* — Spencer E. Bell
*Assistant Examiner* — Omair Chaudhri
(74) *Attorney, Agent, or Firm* — Michael E. Tschupp; Andre Pallapies; Brandon G. Braun (57) ABSTRACT

A rinsing container for a household dishwashing machine includes a bottom plate, a rear wall, and a U-shaped rinsing container jacket which is arranged on the bottom plate and fixedly connected thereto via a folded joint. Integrally formed on the bottom plate and on the rinsing container jacket is a fastening flange for fastening the rear wall to the bottom plate and to the rinsing container jacket, with the fastening flange configured to form a part of the folded joint. A folding sealing means is provided in the folded joint and formed as a sealing bead, with the sealing bead having in the folding-joint-forming part of the fastening flange a first cross-sectional surface which is greater than a cross-sectional surface in a central region of the folded joint.

15 Claims, 9 Drawing Sheets

(51) Int. Cl.
*F16B 11/00* (2006.01)
*A47L 15/00* (2006.01)

(56) References Cited

U.S. PATENT DOCUMENTS

| | | |
|---|---|---|
| 2011/0232194 A1 | 9/2011 | Egger |
| 2020/0196829 A1 | 6/2020 | Budzynski |

FOREIGN PATENT DOCUMENTS

| | | | | |
|---|---|---|---|---|
| DE | 102007017280 A1 * | 10/2008 | ......... | A47L 15/4246 |
| DE | 102009001896 A | 9/2010 | | |
| DE | 102009001896 A1 * | 9/2010 | ......... | A47L 15/4246 |
| DE | 102009001897 A1 * | 9/2010 | ......... | A47L 15/4246 |
| DE | 102009001897 A1 | 9/2010 | | |
| DE | 102011017635 A1 | 10/2012 | | |
| DE | 102011017635 A1 * | 10/2012 | ......... | A47L 15/4246 |
| DE | 102015216228 A1 * | 3/2017 | ......... | A47L 15/4246 |
| EP | 2124700 B1 * | 6/2013 | ......... | A47L 15/4246 |
| EP | 2289387 B1 | 11/2013 | | |
| EP | 2430965 B1 | 2/2018 | | |
| FR | 2396603 A1 | 2/1979 | | |
| WO | WO-2007065875 A1 * | 6/2007 | ......... | A47L 15/4246 |
| WO | 2012008105 A1 | 1/2012 | | |
| WO | 2014191246 A1 | 12/2014 | | |
| WO | WO-2014191246 A1 * | 12/2014 | ......... | A47L 15/4246 |
| WO | 2017032779 A1 | 3/2017 | | |

\* cited by examiner

RINSING CONTAINER, METHOD FOR PRODUCING A RINSING CONTAINER AND HOUSEHOLD DISHWASHING MACHINE

CROSS-REFERENCES TO RELATED APPLICATIONS

This application is the U.S. National Stage of International Application No. PCT/EP2018/063622, filed May 24, 2018, which designated the United States and has been published as International Publication No. WO 2018/224324 A1 and which claims the priority of German Patent Application, Serial No. 10 2017 209 824.4, filed Jun. 9, 2017, pursuant to 35 U.S.C. 119(a)-(d).

BACKGROUND OF THE INVENTION

The present invention relates to various embodiments of a rinsing container for a household dishwashing machine, various embodiments of a method for producing such a rinsing container and a household dishwashing machine comprising such a rinsing container.

A dishwasher generally has a rinsing container which is formed from a plurality of sheet metal portions which are connected together. Generally, the rinsing container comprises a rear wall which is connected to a flange of a rinsing container jacket and a bottom plate. A rear wall sealing means is generally provided between the rear wall and the flange. One challenge is to seal in a reliable manner surface irregularities on the flange, such as for example grooves, which are caused by the construction thereof. For example, folded joints may have seam grooves. In this case, the sealing of such folded joints relative to an opposing sealing surface constitutes a particular problem.

BRIEF SUMMARY OF THE INVENTION

In view of this background to the invention, an object of the present invention is to provide an improved rinsing container for a household dishwashing machine.

Accordingly, a rinsing container for a household dishwashing machine is proposed, comprising a bottom plate, a rear wall, a U-shaped rinsing container jacket arranged on the bottom plate and fixedly connected thereto with the aid of a folded joint, a fastening flange integrally formed on the bottom plate and on the rinsing container jacket for fastening the rear wall to the bottom plate and to the rinsing container jacket, wherein the fastening flange has a part of the folded joint and a folding sealing means that is provided in the folded joint and formed as a sealing bead. A cross-sectional surface of the sealing bead in the part of the fastening flange which is formed by the folded joint is greater than a cross-sectional surface in a central region of the folded joint.

Folded joints have the advantage that different metals may be connected together in a fixed and permanent manner. For example, the rinsing container jacket is formed from a steel plate which is cost-effective and the bottom plate is formed from a stainless steel plate which has high corrosion resistance and a high quality appearance. The part of the fastening flange formed by the folded joint has, in particular, a seam groove.

Since the cross-sectional surface of the sealing bead is partially raised on the fastening flange, the seam groove on the fastening flange may be entirely filled up by the folding sealing means and optionally wet the rear wall and/or a rear wall sealing means. Thus a reliable seal may be provided of the part of the fastening flange formed by the folded joint.

It goes without saying that before forming the folded joint the sealing bead has a first state—after being applied onto the bottom plate and/or the rinsing container jacket—and after forming the folded joint a second deformed and/or compressed state. The greater cross-sectional surface may already be provided in the first state (for example by providing a thickening) so that when the sealing bead is brought into the second state (folding) the folding sealing means is partially pushed out of the folded joint on the fastening flange. Such a partial escape of the folding sealing means on the fastening flange is not visible or barely visible to a user of the household dishwashing machine, since the fastening flange is concealed by the rear wall. For example, an escape of the folding sealing means on the folded joint in the field of view of the user is undesirable.

The "cross-sectional surface" of the sealing bead is understood in the present case as being the surface which is viewed in a section which runs perpendicular to a depth direction and/or a width direction of the rinsing container or the household dishwashing machine. For example, the sealing bead is substantially an elongated body, the cross-sectional surface thereof running correspondingly perpendicular to a longitudinal extent of the sealing bead. The "central region" of the folded joint is, in particular, a region which is provided in the depth direction, in particular exactly, between a closed door of the household dishwashing machine or a loading opening and the rear wall. A seam groove of the central region of the folded joint preferably faces a rinsing chamber which is enclosed by the bottom plate and the rinsing container jacket and is located in the field of view of the user.

A region in which the folded joint of the fastening flange faces the rear wall and is in contact therewith or with the rear wall sealing means may also be denoted as the "triple point" since the rinsing container jacket, the bottom plate and the rear wall adjoin one another in this region.

According to one embodiment, the rinsing container comprises a rear wall sealing means which is provided in a peripheral manner along the fastening flange between the rear wall and the fastening flange, wherein the folding sealing means and the rear wall sealing means are in contact with one another in the part of the fastening flange formed by the folded joint.

For example, the rear wall sealing means is configured as silicone or the rear wall sealing means comprises silicone. Preferably, the rear wall sealing means is configured so as to correspond to the fastening flange and, in particular, in a peripheral and closed manner.

According to a further embodiment, the greater cross-sectional surface of the sealing bead has a surface which is at least twice, three times, four times or five times the cross-sectional surface in the central region of the folded joint.

Thus it is possible to ensure sufficient wetting of the rear wall and/or the rear wall sealing means in order to seal, in particular, the seam groove on the fastening flange. Preferably, the sealing bead has a diameter of between 0.8 and 1.2 mm, in particular of 1 mm, in the central region and a diameter of between 1.8 and 2.2 mm, in particular of 2 mm, in a region which forms the fastening flange after the reshaping.

According to a further embodiment, the folding sealing means is configured as hot melt adhesive and/or silicone.

For example, the folding sealing means and the rear wall sealing means are formed from the same material or the folding sealing means and the rear wall sealing means have the same chemical composition. Alternatively, the folding sealing means and the rear wall sealing means have different chemical compositions. The folding sealing means is preferably a pressure-sensitive hot melt adhesive.

According to a further embodiment, the rinsing container comprises a frame, wherein the folded joint comprises an overlapping region with the frame, wherein a cross-sectional surface of the sealing bead in the overlapping region is greater than the cross-sectional surface in the central region of the folded joint.

That which was stated about the cross-sectional surface of the sealing bead in the part of the fastening flange formed by the folded joint accordingly applies to the cross-sectional surface of the sealing bead in the overlapping region. For example, the overlapping region does not form a region which is visible to the user so that accordingly an escape of the folding sealing means from the seam is not visible. Two thickenings, namely for the fastening flange and for the overlapping region, may already be provided in the first state of the sealing bead. The central region in this case is preferably located between the thickenings. It goes without saying that two corresponding sealing beads may be formed on two folded joints of the rinsing container.

According to a further embodiment, the folded joint has a greater width in the overlapping region of the folded joint than in the central region of the folded joint.

For example, this is because the folded joint in the overlapping region has less compaction, since a folding process in the overlapping region is carried out under difficult conditions. For example, a bending force (or folding force) by which the plates are bent (folded) to form the folded joint are reduced in the overlapping region since only a reduced counterforce may be applied due to the frame. However, in order to ensure a sufficient tightness of the folded joint a greater volume of the folding sealing means is provided in the overlapping region.

Moreover, a method for producing a rinsing container, in particular as disclosed above, is proposed for a household dishwashing machine, having the steps: providing a bottom plate, a rear wall and a U-shaped rinsing container jacket, providing a folding sealing means on the bottom plate and/or the rinsing container jacket for sealing a folded joint and forming a sealing bead, arranging the rinsing container jacket on the bottom plate, forming the folded joint and connecting the rinsing container jacket to the bottom plate by means of the folded joint and integrally forming a fastening flange on the bottom plate and the rinsing container jacket for fastening the rear wall to the bottom plate and to the rinsing container jacket, wherein a cross-sectional surface of the sealing bead in a part of the fastening flange formed by the folded joint is greater than a cross-sectional surface in a central region of the folded joint.

Moreover, a rinsing container for a household dishwashing machine is proposed, comprising a bottom plate, a rear wall, a U-shaped rinsing container jacket arranged on the bottom plate and fixedly connected thereto with the aid of a folded joint, a fastening flange integrally formed on the bottom plate and the rinsing container jacket for fastening the rear wall to the bottom plate and to the rinsing container jacket, a folding sealing means which is provided in the folded joint, a rear wall sealing means, which is provided between the rear wall and the fastening flange, and an additional sealing means which is provided between the folding sealing means and the rear wall sealing means.

Thus an alternative solution is provided in order to ensure, for example, a reliable seal in the seam groove of the fastening flange and/or in the region of the triple point. The advantage is that, for example, conventional folding sealing means, in particular with a substantially uniform volume, density and/or thickness, and a conventional rear wall sealing means, in particular with a substantially uniform volume, density and/or thickness, may be used and, in particular, only by using the additional sealing means is the tightness improved on the seam groove of the fastening flange and/or in the region of the triple point. In particular, the additional sealing means wets both the seam groove of the fastening flange—preferably also the folding sealing means—and the rear wall sealing means in order to form a seal.

For example, in addition the cross-sectional surface of the sealing bead of the folding sealing means in the part of the fastening flange formed by the folded joint is greater than the cross-sectional surface formed in the central region of the folded joint in order to improve further the tightness.

According to one embodiment, the fastening flange comprises a part of the folded joint, wherein the additional sealing means is provided only on or against this part of the folded joint.

Thus the additional sealing means is only partially provided on the seam groove of the fastening flange and/or the triple point and thus the tightness is improved whilst savings are made in terms of resources.

According to a further embodiment, the additional sealing means is configured as a hot melt adhesive and/or a pressure-sensitive adhesive.

The pressure-sensitive adhesive has the advantage that, in particular, a liquefaction or softening of the additional sealing means takes place by pressing the rear wall against the fastening flange so that the additional sealing means is pushed into the seam groove of the fastening flange. The hot melt adhesive may be configured or denoted as hot melt. Alternatively or additionally, the additional sealing means may be configured as silicone or comprise silicone. For example, the additional sealing means has a chemical composition which is the same as or different from the folding sealing means and/or the rear wall sealing means.

Additionally, a method for producing a rinsing container for a household dishwashing machine is proposed, having the steps: providing a bottom plate, a rear wall and a U-shaped rinsing container jacket, arranging the rinsing container jacket on the bottom plate, forming the folded joint and connecting the rinsing container jacket to the bottom plate by means of the folded joint, integrally forming a fastening flange on the bottom plate and the rinsing container jacket for fastening the rear wall to the bottom plate and to the rinsing container jacket, arranging the rear wall on the fastening flange, providing a folding sealing means in the folded joint, providing a rear wall sealing means between the rear wall and the fastening flange and providing an additional sealing means between the folding sealing means and the rear wall sealing means.

By way of example, the provision of the folding sealing means in the folded joint is carried out together with the formation of the folded joint, wherein the folding sealing means is applied onto the bottom plate before the formation of the folded joint.

According to one embodiment, after arranging the rear wall on the fastening flange a compressive force is applied by means of a punch onto a bent-back corner portion of the folded joint in order to reduce a corner radius of the folded joint in the corner portion and to push the additional sealing means into the folded joint.

Preferably, the folded joint has a quadruple plate thickness when viewed in a section perpendicular to a vertical direction. Conversely, a single plate thickness is located above and below the folded joint. When integrally forming the fastening flange, the remaining corner radius and/or radius of curvature on the corner portion in the folded joint is greater than above and below the folded joint. Thus it is advantageous to bend back the corner radius additionally by means of the punch partially on the folded joint in order to compensate for surface irregularities on the fastening flange. Moreover, as a result, the additional sealing means and/or the rear wall sealing means and/or the folding sealing means are pushed into the seam groove of the fastening flange.

Moreover, a rinsing container for a household dishwashing machine is proposed, comprising a bottom plate, a rear wall with a receiving bead for a rear wall sealing means, a U-shaped rinsing container jacket arranged on the bottom plate and fixedly connected thereto with the aid of a folded joint, a fastening flange integrally formed on the bottom plate and the rinsing container jacket for fastening the rear wall to the bottom plate and to the rinsing container jacket and the rear wall sealing means, which is provided between the rear wall and the fastening flange as a sealing bead, wherein the receiving bead has a widening in which a cross-sectional enlargement of the sealing bead is provided.

Thus a further alternative solution is provided in order to ensure, for example, a reliable seal in the seam groove of the fastening flange and/or in the region of the triple point. For example, the proposed alternative may also be used with the additional sealing means. Alternatively or additionally, the cross-sectional surface of the sealing bead of the folding sealing means in the part of the fastening flange formed by the folded joint may be configured to be greater than the cross-sectional surface in the central region of the folded joint.

According to a further embodiment, the widening of the receiving bead is arranged so as to overlap with the folded joint.

Moreover, a household dishwashing machine having a rinsing container as described above is proposed.

A door which is pivotable about a pivot axis may be fastened to the rinsing container in order to open and close the rinsing container. A plurality of, for example three, receivers for items to be washed may be provided in the rinsing container for the items to be washed.

The embodiments and features described relative to the proposed rinsing container correspondingly apply to each of the proposed rinsing containers and to the proposed method. It goes without saying that the fastening flange may have two seam grooves (or even more) and that the proposed measures may be applied to all seam grooves.

Further possible implementations of the invention also encompass combinations, not explicitly cited, of features or embodiments described above or below relative to the exemplary embodiments. In this case, the person skilled in the art may also add individual features as improvements or additions to the respective basic form of the invention.

BRIEF DESCRIPTION OF THE DRAWINGS

Further advantageous embodiments and features of the invention form the subject-matter of the subclaims as well as exemplary embodiments of the invention described below. The invention is described in more detail hereinafter by means of preferred embodiments with reference to the accompanying drawings, in which:

DETAILED DESCRIPTION OF EXEMPLARY EMBODIMENTS OF THE PRESENT INVENTION

Elements which are the same or functionally the same are provided in the figures with the same reference characters, unless indicated otherwise.

Figure 1:
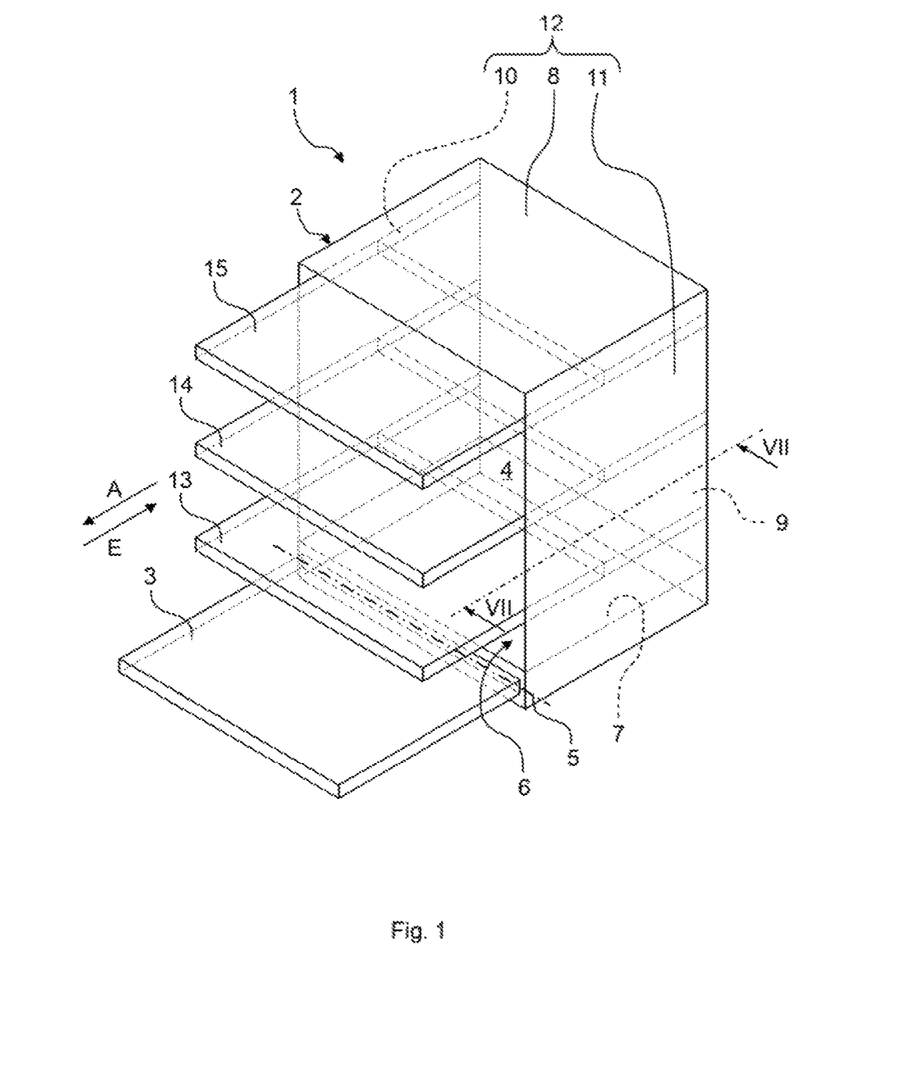
FIG. 1 shows a schematic perspective view of an embodiment of a household dishwashing machine.

FIG. 1 shows a schematic perspective view of a household dishwashing machine 1. The household dishwashing machine 1 comprises a rinsing container 2 which is able to be closed by a door 3, in particular in a watertight manner. To this end, a sealing device may be provided between the door 3 and the rinsing container 2. The rinsing container 2 is preferably cuboidal. The rinsing container 2 may be arranged in a housing of the household dishwashing machine 1. The rinsing container 2 and the door 3 may form a rinsing chamber 4 for washing items to be washed.

The door 3 in FIG. 1 is shown in its open position. The door 3 may be closed or opened by pivoting about a pivot axis 5 provided at a lower end of the door 3. A loading opening 6 of the rinsing container 2 may be closed or opened by means of the door 3. The rinsing container 2 has a bottom plate 7, a ceiling 8 arranged opposite the bottom plate 7, a rear wall 9 arranged opposite the closed door 3 and two opposingly arranged side walls 10, 11. The bottom plate 7, the ceiling 8, the rear wall 9 and the side walls 10, 11 may be made, for example, from sheet steel. In particular, for example, the bottom plate 7 may be made from a different material from the ceiling 8 and the side walls 10, 11. For example, the bottom plate 7 may be made from the material 1.4301, the ceiling 8 and the side walls 10, 11 from the material 1.4016 and the rear wall 9 also from the material 1.4016.

A first side wall 10, a second side wall 11 and the ceiling 8 arranged between the first side wall 10 and the second side wall 11 are in one piece, in particular made integrally from the same material, and form a rinsing container jacket 12 of the rinsing container 2. The rinsing container jacket 12, the rear wall 9 and the bottom plate 7 are components which are made separately from one another but which are connected together in a watertight manner. For example, the rinsing container jacket 12 is connected to the bottom plate 7 by means of two folded joints and the rear wall 9 is welded to the rinsing container jacket 12 and to the bottom plate 7, in particular spot-welded thereto.

The household dishwashing machine 1 further comprises at least one receiver for items to be washed 13 to 15. Preferably, a plurality of, for example three, receivers for items to be washed 13 to 15 may be provided, wherein the receiver for items to be washed 13 may be a lower receiver for items to be washed or a lower basket, the receiver for items to be washed 14 may be an upper receiver for items to be washed or an upper basket, and the receiver for items to be washed 15 may be a cutlery drawer. As FIG. 1 also shows, the receivers for items to be washed 13 to 15 are superposed in the rinsing container 2. Each receiver for items to be washed 13 to 15 is optionally displaceable into or out of the rinsing container 2. In particular, each receiver for items to be washed 13 to 15 is able to be inserted in an insertion direction E (arrow) into the rinsing container 2 and withdrawn counter to the insertion direction E (arrow) in a withdrawal direction A (arrow) out of the rinsing container 2.

Figure 2:
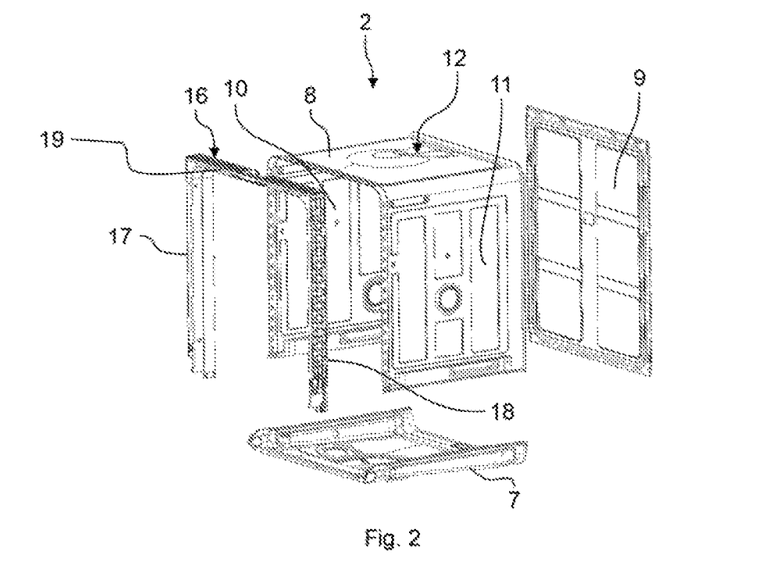
FIG. 2 shows a schematic perspective exploded view of an embodiment of a rinsing container for the household dishwashing machine according to FIG. 1.
Figure 3:
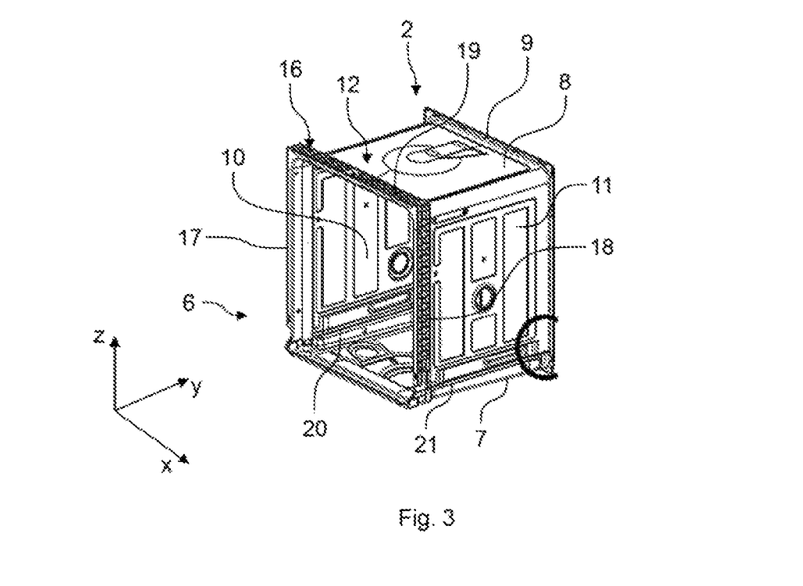
FIG. 3 shows a schematic perspective view of the rinsing container according to FIG. 2.

FIG. 2 shows a schematic perspective exploded view of an embodiment of the rinsing container 2 for the household dishwashing machine 1 according to FIG. 1. FIG. 3 shows a schematic perspective view of the rinsing container 2 according to FIG. 2. Reference is made simultaneously to FIGS. 2 and 3 hereinafter.

In addition to the U-shaped rinsing container jacket 12, the bottom plate 7 and the rear wall 9, the rinsing container 2 comprises a U-shaped frame 16 which supports the rinsing container jacket 12. To this end, the frame 16 is fixedly connected to the rinsing container jacket 12. In particular, the frame 16 is connected by means of thermo-riveting to the rinsing container jacket 12. The frame 16 is preferably a plastics component. In particular, the frame 16 is a plastics injection-molded component. As a result, the frame 16 may be produced cost-effectively in large quantities.

The frame 16 is designed such that it is provided on the loading opening 6 and is arranged at least partially inside the rinsing container jacket 12 and at least partially outside the rinsing container jacket 12. The rinsing container 2 further comprises a bottom support, not shown in FIGS. 2 and 3, which is arranged below the bottom plate 7. In particular, the rinsing container 2 is supported on the bottom support. The bottom support is a plastics component, in particular a plastics injection-molded component.

As FIG. 3 shows, the frame 16 is pushed onto the loading opening 6 on the front face and thus reinforces the rinsing container jacket 12 in the region of the loading opening 6. The frame 16 comprises a first limb 17, a second limb 18 as well as an intermediate limb 19 which joins the first limb 17 to the second limb 18. The first limb 17 is fixedly connected to the first side wall 10, the second limb 18 is fixedly connected to the second side wall 11 and the intermediate limb 19 is fixedly connected to the ceiling 8.

The first side wall 10 may be connected to the bottom plate 7 by means of a first crimped joint or first folded joint 20 and the second side wall 11 may also be connected to the bottom plate 7 by means of a second crimped joint or second folded joint 21. Folding or crimping in the present case is to be understood as a connecting technique in sheet metal processing. This connecting technique forms part of the group of connecting methods by reshaping. In this case, an edge of a plate is bent back, for example, by means of a crimping machine or folding machine. As a result, a reinforcement of the bent-back edge is achieved and a joint consisting of a plurality of sheet metal components may be provided. The folded joints 20, 21 extend in each case over the entire depth of the rinsing container 2, i.e. from the loading opening 6 to the rear wall 9. A width direction x of the rinsing container 2 faces from the first side wall 10 to the second side wall 11, a depth direction y (arrow) faces from the loading opening 6 to the rear wall 9 and a vertical direction z (arrow) faces from the bottom plate 7 to the ceiling 8, wherein the width direction x (arrow), depth direction y (arrow) and vertical direction z (arrow) are arranged in each case substantially perpendicular to one another.

Figure 4:
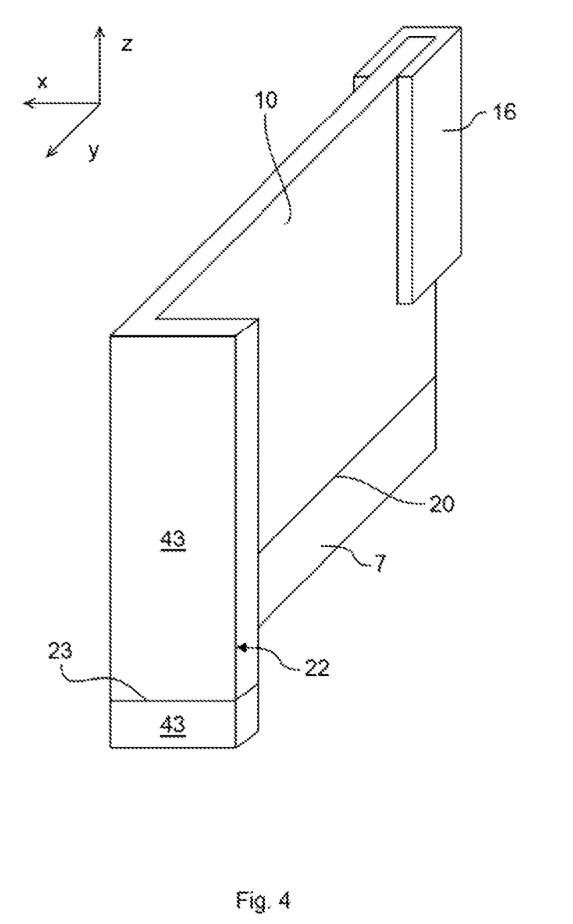
FIG. 4 shows a schematic perspective view of a portion of the rinsing container according to FIG. 3.

FIG. 4 shows in a schematic perspective view a portion of the first side wall 10, a portion of the bottom plate 7, which are connected together by means of the first folded joint 20, and a portion of the frame 16. In this case, a fastening flange 22 for fastening the rear wall 9 to the bottom plate 7 and to the rinsing container jacket 12 is integrally formed on the bottom plate 7 and on the rinsing container jacket 12, (in FIG. 4 only the first side wall 10 of the rinsing container 12 is shown). The fastening flange 22 is bent outwardly away from the rinsing chamber 4 and forms a connecting surface 43 with the rear wall 9, said connecting surface facing the rear wall 9. Moreover, the fastening flange 22 comprises a part 23 of the folded joint 20. It goes without saying that the second side wall 11 is connected in a similar manner to the bottom plate 7 and comprises a portion of the fastening flange 22 (not shown in FIG. 4). Moreover, the ceiling 8 may comprise a further portion of the fastening flange 22 (not shown in FIG. 4).

Figure 5:
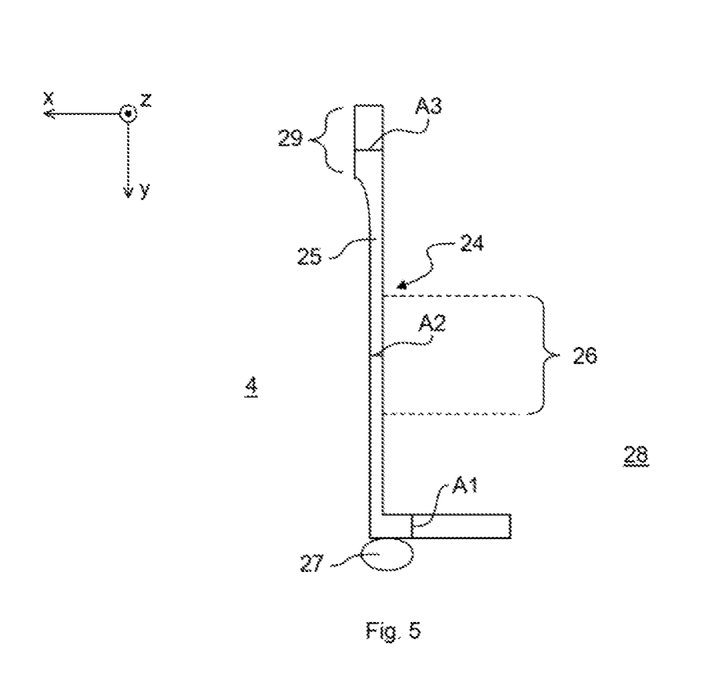
FIG. 5 shows an embodiment of a sealing bead of the portion according to FIG. 4.

FIG. 5 shows a folding sealing means 24, which is provided in the folded joint 20 according to FIG. 4 and configured as a sealing bead 25, in a schematic plan view. The sealing bead 25 extends without interruption over the entire length of the folded joint 20. The folding sealing means 24 is configured, for example, as hot melt adhesive and/or silicone. A cross-sectional surface A1 of the sealing bead 25 in the part 23 of the fastening flange 22 formed by the folded joint 20 is greater than a cross-sectional surface A2 in a central region 26 of the folded joint 20. The central region 26 is a region which is provided in the depth direction y (arrow), in particular exactly, between the closed door 3 or the loading opening 6 and the rear wall 9. The greater cross-sectional surface A1 of the sealing bead 25 has, for example, a surface which is at least twice, three times or four times as great the cross-sectional surface A2 in the central region 26 of the folded joint 20.

For example, a rear wall sealing means 27 is provided in a peripheral manner along the fastening flange 22 between the rear wall 9 and the fastening flange 22. As may be identified in FIG. 9, the folded joint 20 has a seam groove 32 which impedes the seal, in particular, in the region of the part 23 of the fastening flange 22. Thus in the part 23 of the fastening flange 22 formed by the folded joint 20 the folding sealing means 24 and the rear wall sealing means 27 are brought into contact with one another, in order to seal together the rinsing chamber 4 relative to the surroundings 28 in the region of the part 23 of the fastening flange 22. Moreover, a greater volume of the folding sealing means 24 is provided on the part 23 of the folded joint 20 and an improved tightness is effected on the part 23 of the folded joint 20.

Moreover, the folded joint 20 has an overlapping region 29 relative to the frame 16, in particular the limb 17. In the overlapping region 29 the folded joint 20 may be closed with greater difficulty than in the central region 26, since when closing the folded joint 20 in the overlapping region 29 only a reduced counterforce is applied from the inner face of the rinsing chamber 4 due to the frame 16 which is present at that point. Thus the folded joint 20 in the overlapping region 29 of the folded joint 20 has a greater width (viewed in the width direction x (arrow) than in the central region 26 of the folded joint 20. However, in order to ensure a sufficient tightness on the folded joint 20 in the overlapping region 29, accordingly a greater volume of the folding sealing means 24 is provided in some regions so that a cross-sectional surface A3 of the sealing bead 25 in the overlapping region 29 is greater than the cross-sectional surface A2. The provision of different quantities of the folding sealing means 24 is already carried out before forming the folded joint 20, when applying the folding sealing means 24 onto the bottom plate 7 and/or the side walls 10, 11 by means, for example, of a metering system, which meters different quantities thereof.

Figure 6:
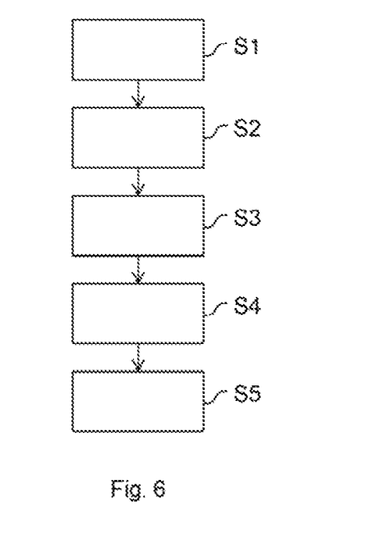
FIG. 6 shows a schematic block diagram of an embodiment of a method for producing the rinsing container according to FIG. 3.

FIG. 6 shows a schematic block diagram of a method for producing the rinsing container 2, in particular with a sealing bead 25 as shown in FIG. 5.

In this case, in a first step S1 the bottom plate 7, the rear wall 9 and the U-shaped rinsing container jacket 12 are provided. In a step S2 the folding sealing means 24 is provided on the bottom plate 7 and/or the rinsing container 12 for sealing the folded joint 20, 21 and forming the sealing bead 25. Preferably, in this case the sealing bead 25 has different thicknesses along the extent thereof. In a step S3, the rinsing container jacket 12 is arranged on the bottom plate 7. In a step S4 the folded joint 20, 21 is formed and at the same time the rinsing container jacket 12 is connected to the bottom plate 7 by means of the folded joint 20, 21. In a step S5 the fastening flange 22 is integrally formed on the bottom plate 7 and the rinsing container jacket 12 for fastening the rear wall 9 to the bottom plate 7 and to the rinsing container jacket 12, wherein the sealing bead 25 is provided in step S2 such that the cross-sectional surface A1 of the sealing bead 25 in the part 23 of the fastening flange 22 formed by the folded joint 20, 21 is greater than the cross-sectional surface A2 in a central region 26 of the folded joint 20, 21. Moreover, for example, the sealing bead 25 is provided in step S2 such that the cross-sectional surface A3 of the sealing bead 25 in the overlapping region 29 is greater than the cross-sectional surface A2 in a central region 26 of the folded joint 20, 21.

Figure 7:
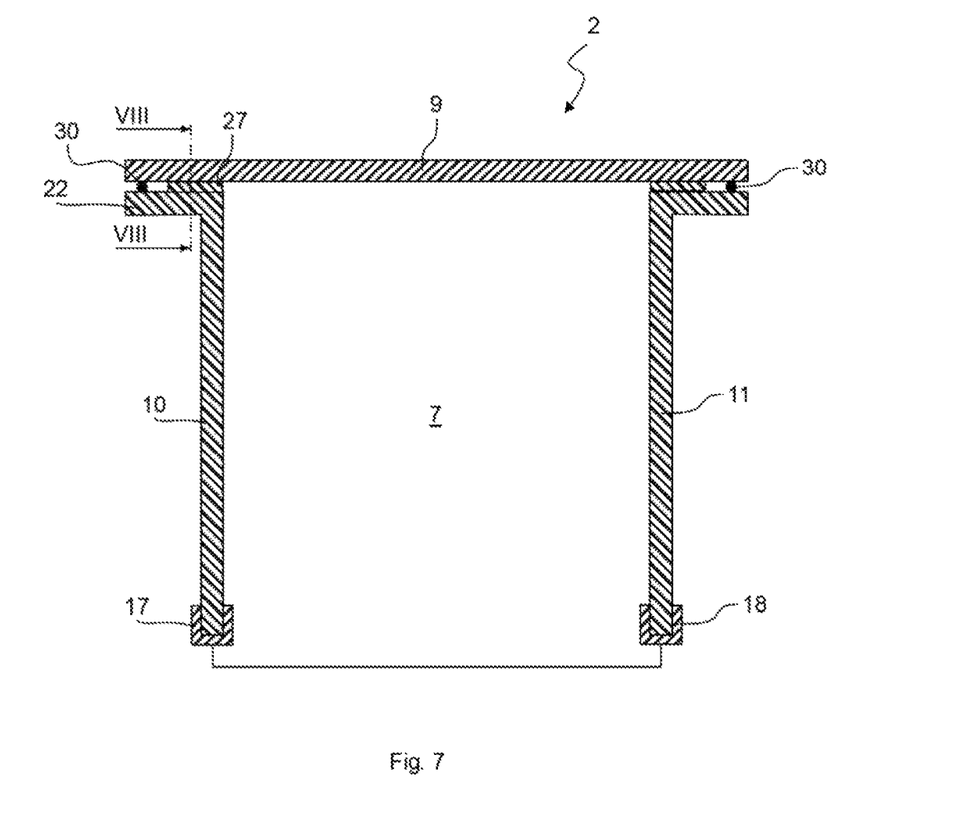
FIG. 7 shows a section VII-VII of FIG. 1.

FIG. 7 shows a schematic section VII-VII of FIG. 1. As visible from FIG. 7, the household dishwashing machine 1 comprises the rear wall sealing means 27 which is provided between the rear wall 9 and the fastening flange 22 and is correspondingly wedged between the rear wall 9 and the fastening flange 22 and compressed. Preferably, the rear wall 9 and the fastening flange 22 are connected together, in particular, by means of welding points, in particular spot welds 30.

Figure 8:
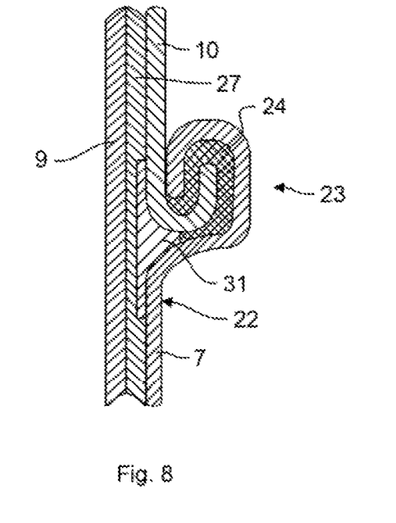
FIG. 8 shows a section VIII-VIII of FIG. 7.

FIG. 8 shows a schematic section VIII-VIII from FIG. 7. In this case it may be identified that the folding sealing means 24 is provided in the folded joint 20 and that the rear wall sealing means 27 is provided between the rear wall 9 and the fastening flange 22. Moreover, an additional sealing means 31 is provided between the folding sealing means 24 and the rear wall sealing means 27. In this case, the additional sealing means 31 is forced into a seam groove 32 (see FIG. 9), in particular, by means of a compressive force onto the rear wall 9.

The seam groove 32 is configured, in particular, as a gap between the side wall 10, 11 and the bottom plate 7. The additional sealing means 31 comes into contact with the rear wall sealing means 27 and the folding sealing means 24 and seals the seam groove 32 in a reliable manner. The additional sealing means 31 may be configured as a hot melt adhesive and/or a pressure-sensitive adhesive. Preferably, the additional sealing means 31 is only provided on or against the part 23 of the folded joint 20 since at this point the seal between the rear wall 9 and the fastening flange 22 is impeded due to the seam groove 32.

Figure 9:
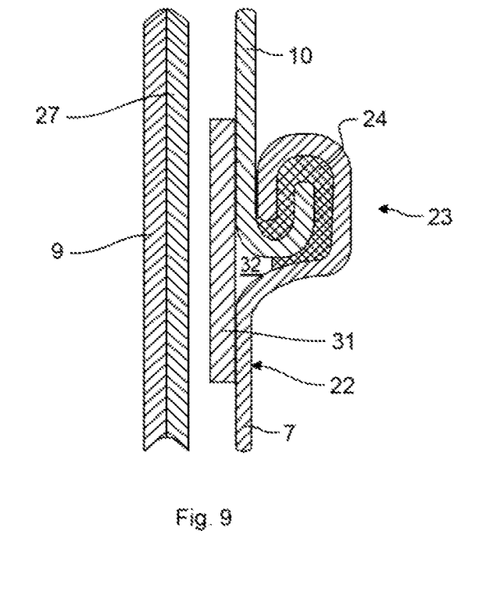
FIG. 9 shows the section VIII-VIII in an exploded view.

In contrast to FIG. 8, FIG. 9 shows schematically the additional sealing means 31 before the rear wall 9 is pushed onto the fastening flange 22 and welded thereto. In this case the additional sealing means 31 is applied partially onto the fastening flange 22 such that it at least partially covers the seam groove 32. Subsequently, when pressing the rear wall 9 against the fastening flange 22 the additional sealing means 31 is forced into the seam groove 32—for forming a sealing arrangement as shown in FIG. 8. For example, the additional sealing means 31 has a liquid or viscous state when pressed on.

Preferably, the additional sealing means 31 is configured as a pressure-sensitive hot melt. This has the advantage that due to the tough and sticky consistency the additional sealing means 31 is prevented from escaping outwardly. Moreover, when pressed on, a liquefaction of the additional sealing means 31 is effected by the corresponding pressure. Thus the additional sealing means 31 are able to wet the seam groove 32 and the rear wall sealing means 27 in a reliable manner. Alternatively, the additional sealing means 31 may have the same chemical composition as the folding sealing means 24 and/or the rear wall sealing means 27.

Figure 10:
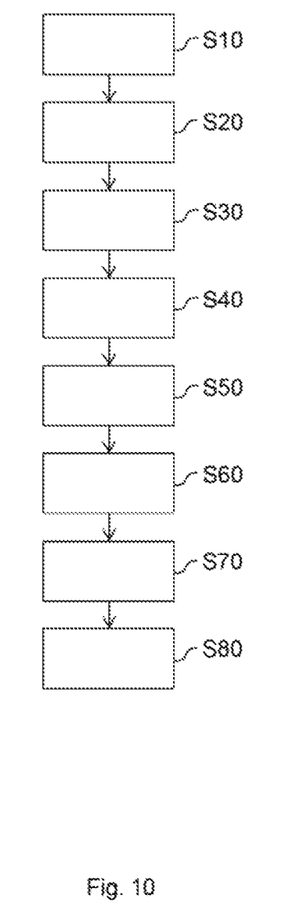
FIG. 10 shows a schematic block diagram of an embodiment of a method for producing a rinsing container according to FIG. 3.

FIG. 10 shows a schematic block diagram of a method for producing the rinsing container 2, in particular as shown in FIGS. 7 to 9. In a step S10 the bottom plate 7, the rear wall 9 and the U-shaped rinsing container jacket 12 are provided. In a step S20 the rinsing container 2 is arranged on the bottom plate 7. In a step S30 the folded joint 20 is formed and the rinsing container jacket 12 is connected to the bottom plate 7 by means of the folded joint 20.

In a step S40 the fastening flange 22 is integrally formed on the bottom plate 7 and the rinsing container jacket 12 for fastening the rear wall 9 to the bottom plate 7 and to the rinsing container jacket 12. In a step S50 the rear wall 9 is arranged on the fastening flange 22. In a step S60 the folding sealing means 24 is provided in the folded joint 20. In a step S70 the rear wall sealing means 27 is provided between the rear wall 9 and the fastening flange 22. In a step S80 the additional sealing means 31 is provided between the folding sealing means 24 and the rear wall sealing means 27.

Figure 11:
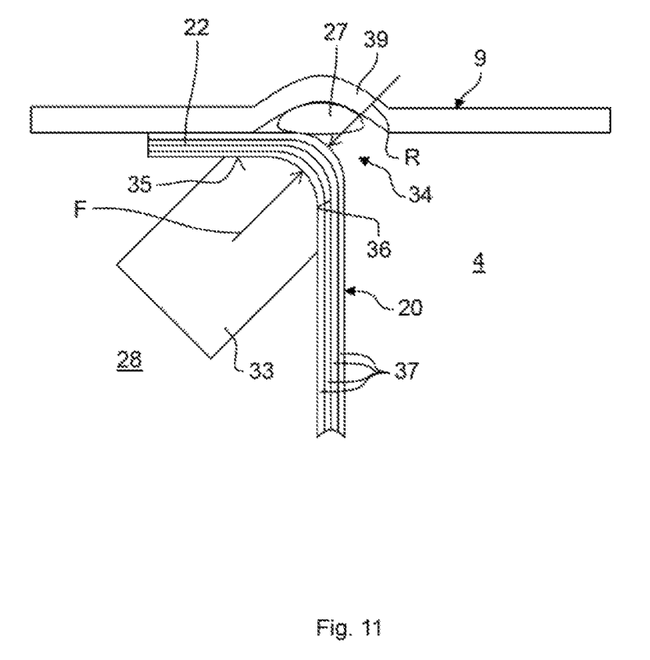
FIG. 11 shows a horizontal section through a folded joint of the rinsing container according to FIG. 3.

FIG. 11 shows a horizontal section through the folded joint 20 and the rear wall 9 during a further production step. Four plate layers 37 are arranged adjacent to one another on the folded joint 20, which impedes the bending of the folded joint 20 for forming the fastening flange 22. In the production step shown in FIG. 11, after arranging the rear wall 9 together with the rear wall sealing means 27 on the fastening flange 22 a compressive force F is applied by means of a punch 33 to an outer face 35 of a corner portion 34 of the folded joint 20. The outer face 35 in this case is a side which is remote from the rinsing chamber 4 and is accessible from outside the rinsing chamber 4. In this case, the compressive force F is applied in order to reduce a corner radius R, which for example may also be denoted as the internal radius, of the folded joint 20 in the corner portion 34 and, in particular, to push the rear wall sealing means 27 into the folded joint 20, in particular into the seam groove 32. The punch 33 has a deformation surface 36 which is formed in the shape of a wedge and which comes into contact with the outer face 35 when the compressive force F is applied.

Alternatively or additionally, after step S50 for example the compressive force F is applied by means of the punch 33 to the bent-back corner portion 34 of the folded joint 20 in order to reduce the corner radius R of the folded joint 20 in the corner portion 34 and to push the additional sealing means 31 into the folded joint 20, in particular the seam groove 32.

Such an application of compressive force F is, for example, denoted as calibration. The calibration has the advantage that the bending radius R in the folded joint 20 may be bent into shape to less than 1.4 mm, in spite of a quadruple plate thickness of 2 mm. Since the rear wall sealing means 27 may be designed for a bending radius R of 1.4 mm a reliable seal on the seam groove 32 is ensured.

Figure 12:
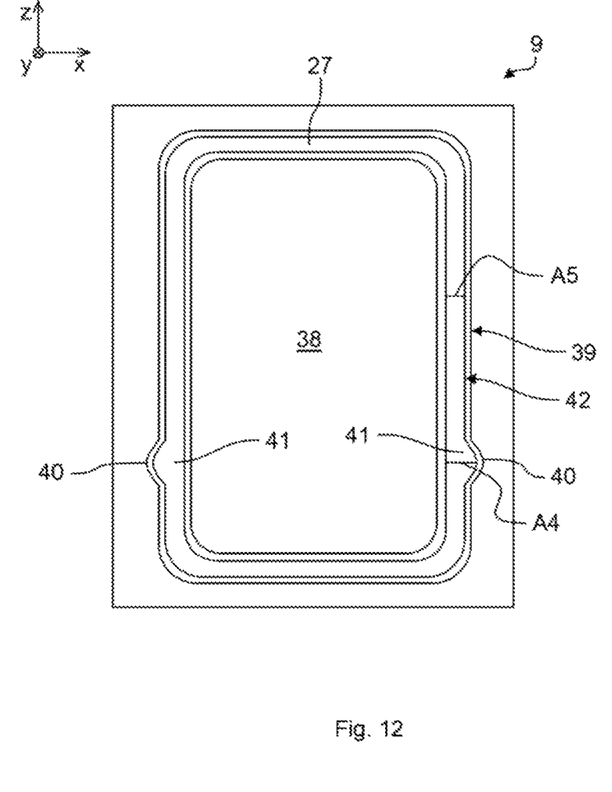
FIG. 12 shows a rear wall of the rinsing container according to FIG. 3.

FIG. 12 shows an inner face 38 of the rear wall 9 which faces the rinsing chamber 4. A receiving bead 39 (see also FIG. 11) for the rear wall sealing means 27 is provided on the inner face 38 of the rear wall 9. The receiving bead 39 is configured as a recess and is designed to receive the rear wall sealing means 27. Moreover, the receiving bead 39 fixes the geometry of the rear wall sealing means 27 and prevents the rear wall sealing means 27 from slipping. The rear wall sealing means 27 is provided on the rear wall 9 as a sealing bead 42. The receiving bead 39 is configured in a peripheral manner and has two widenings 40 in which in each case a cross-sectional enlargement 41 of the sealing bead 42 is provided. A cross-sectional surface A4 on the respective cross-sectional enlargement 41 is greater than a cross-sectional surface A5 on a region outside the cross-sectional enlargement 41. For example, the cross-sectional enlargements 41 are configured as the thickest points of the sealing bead 42.

The widenings 41 of the receiving bead 39 are provided so as to overlap with the folded joint 20 and correspondingly on the seam groove 32. In other words, when viewed in the vertical direction z (arrow), the widenings 40 are arranged at the same height as the seam groove 32. Thus a reliable seal is ensured on the seam groove 32 in the fastening flange 22.

FIG. 5, FIGS. 7 to 10, FIG. 11 and FIG. 12 show various and alternative measures to improve the seal on the seam groove 32 in the fastening flange 22. It is possible that all measures are implemented in one embodiment. Moreover, it is possible that only two or three of the measures are provided so as to be combined together in any manner in one embodiment.

Whilst the present invention has been described with reference to exemplary embodiments it may be modified in many different ways.

The invention claimed is:

1. A rinsing container for a household dishwashing machine, comprising:
   a bottom plate;
   a rear wall;
   a U-shaped rinsing container jacket arranged on the bottom plate and fixedly connected thereto via a folded joint;
   a fastening flange integrally formed on the bottom plate and on the rinsing container jacket for fastening the rear wall to the bottom plate and to the rinsing container jacket, said fastening flange configured to form part of the folded joint; and
   a folding sealing means provided in the folded joint and formed as a sealing bead, wherein a cross-sectional surface area of the sealing bead in a part of the fastening flange formed by the folded joint is larger than a cross-sectional surface area of the sealing bead in a central area of the folded joint, the larger cross-sectional surface area of the sealing bead provided in a first state of the sealing bead after being applied onto the bottom plate or the U-shaped rinsing container jacket and prior to a second deformed or compressed state of the sealing bead.

2. The rinsing container of claim 1, wherein the cross-sectional surface area of the sealing bead in the part of the fastening flange formed by the folded joint has a surface area which is at least twice, three times, four times or five times the cross-sectional surface area in the central area of the folded joint.

3. The rinsing container of claim 1, wherein the folding sealing means is configured as hot melt adhesive and/or silicone.

4. The rinsing container of claim 1, further comprising a rear wall sealing means provided in a peripheral manner along the fastening flange between the rear wall and the fastening flange, with the folding sealing means and the rear wall sealing means contacting one another in the part of the fastening flange formed by the folded joint.

5. The rinsing container of claim 1, further comprising a frame, with the folded joint including an overlapping region with the frame, said sealing bead having in the overlapping region a second cross-sectional surface area which is greater than the cross-sectional surface area in the central area of the folded joint.

6. The rinsing container of claim 5, wherein the folded joint has in the overlapping region of the folded joint a width which is greater than a width in the central area of the folded joint.

7. A method for producing a rinsing container for a household dishwashing machine, comprising:
   providing a folding sealing means on at least one of a bottom plate and a U-shaped rinsing container jacket for sealing a folded joint and forming a sealing bead;
   arranging the rinsing container jacket on the bottom plate;
   forming the folded joint to thereby connect the rinsing container jacket to the bottom plate via the folded joint; and
   integrally forming a fastening flange on the bottom plate and the rinsing container jacket for fastening a rear wall to the bottom plate and to the rinsing container jacket, wherein a cross-sectional surface area of the sealing bead in a part of the fastening flange formed by the folded joint is larger than a cross-sectional surface area of the sealing bead in a central region of the folded joint, the larger cross-sectional surface area of the sealing bead provided in a first state of the bead after being applied to the bottom plate or the U-shaped rinsing container jacket and prior to a second deformed or compressed state of the sealing bead.

8. A rinsing container for a household dishwashing machine, comprising:
   a bottom plate;
   a rear wall;
   a U-shaped rinsing container jacket arranged on the bottom plate and fixedly connected thereto via a folded joint;
   a fastening flange integrally formed on the bottom plate and on the rinsing container jacket for fastening the rear wall to the bottom plate and to the rinsing container jacket;
   a folding sealing means provided in the folded joint and formed as a sealing bead, wherein a cross-sectional surface area of the sealing bead in a part of the fastening flange formed by the folded joint is larger than a cross-sectional surface area of the sealing bead in a central area of the folded joint, the larger cross-sectional surface area of the sealing bead provided in a first state of the sealing bead after being applied onto the bottom plate or the U-shaped rinsing container jacket and prior to a second deformed or compressed state of the sealing bead;
a rear wall sealing means provided between the rear wall and the fastening flange; and
an additional sealing means provided between the folding sealing means and the rear wall sealing means.

9. The rinsing container of claim 8, wherein the fastening flange forms a part of the folded joint, said additional sealing means being provided only on or against the part of the folded joint.

10. The rinsing container of claim 8, wherein the additional sealing means is configured as a hot melt adhesive and/or a pressure-sensitive adhesive.

11. A method for producing a rinsing container for a household dishwashing machine, comprising:
arranging a U-shaped rinsing container jacket on a bottom plate;
connecting the rinsing container jacket to the bottom plate by a folded joint;
integrally forming a fastening flange on the bottom plate and the rinsing container jacket for fastening a rear wall to the bottom plate and to the rinsing container jacket,
arranging the rear wall on the fastening flange;
providing a folding sealing means in the folded joint;
forming the folding sealing means as a sealing bead, wherein a cross-sectional surface area of the sealing bead in a part of the fastening flange formed by the folded joint is larger than a cross-sectional surface area of the sealing bead in a central area of the folded joint, the larger cross-sectional surface area of the sealing bead provided in a first state of the sealing bead after being applied onto the bottom plate or the U-shaped rinsing container jacket and prior to a second deformed or compressed state of the sealing bead;
providing a rear wall sealing means between the rear wall and the fastening flange; and
providing an additional sealing means between the folding sealing means and the rear wall sealing means.

12. The method of claim 11, further comprising applying, after arranging the rear wall on the fastening flange, a compressive force by a punch onto a bent-back corner portion of the folded joint so as to reduce a corner radius of the folded joint in the corner portion and to push the additional sealing means into the folded joint.

13. A rinsing container for a household dishwashing machine, comprising:

a bottom plate;
a rear wall having a receiving bead;
a U-shaped rinsing container jacket arranged on the bottom plate and fixedly connected thereto via a folded joint;
a fastening flange integrally formed on the bottom plate and the rinsing container jacket for fastening the rear wall to the bottom plate and to the rinsing container jacket;
a folding sealing means provided in the folded joint and formed as a sealing bead, wherein a cross-sectional surface area of the sealing bead in a part of the fastening flange formed by the folded joint is larger than a cross-sectional surface area of the sealing bead in a central area of the folded joint, the larger cross-sectional surface area of the sealing bead provided in a first state of the sealing bead after being applied onto the bottom plate or the U-shaped rinsing container jacket and prior to a second deformed or compressed state of the sealing bead; and
a rear wall sealing means received in a recess formed by the receiving bead, said rear wall sealing means being provided between the rear wall and the fastening flange as a sealing bead, said receiving bead having a widening in which a cross-sectional enlargement of the sealing bead is provided.

14. The rinsing container of claim 13, wherein the widening of the receiving bead is arranged so as to overlap with the folded joint.

15. A household dishwashing machine, comprising a rinsing container configured in way in which the rinsing container includes a bottom plate, a rear wall, a U-shaped rinsing container jacket arranged on the bottom plate and fixedly connected thereto via a folded joint, a fastening flange integrally formed on the bottom plate and on the rinsing container jacket for fastening the rear wall to the bottom plate and to the rinsing container jacket, said fastening flange configured to form part of the folded joint, and a folding sealing means provided in the folded joint and formed as a sealing bead, said sealing bead having in a part of the fastening flange formed by the folded joint a cross-sectional surface area which is larger than a cross-sectional surface area in a central area of the folded joint, the larger cross-sectional area of the bead provided in a first state of the sealing bead after being applied onto the bottom plate or the U-shaped rinsing container jacket and prior to a deformed or compressed state of the sealing bead.

* * * * *